(12) United States Patent
Horiguchi et al.

(10) Patent No.: US 7,022,967 B2
(45) Date of Patent: Apr. 4, 2006

(54) PHOTODETECTOR WITH PLURAL SWITCHED FEEDBACK RESISTORS

(75) Inventors: Atsushi Horiguchi, Yokohama (JP); Tohru Mori, Yokohama (JP)

(73) Assignee: Yokogawa Electric Corporation, Tokyo (JP)

( * ) Notice: Subject to any disclaimer, the term of this patent is extended or adjusted under 35 U.S.C. 154(b) by 260 days.

(21) Appl. No.: 10/648,110

(22) Filed: Aug. 26, 2003

(65) Prior Publication Data

US 2004/0036012 A1  Feb. 26, 2004

(30) Foreign Application Priority Data

Aug. 26, 2002  (JP) .................... P. 2002-245343

(51) Int. Cl.
*H01J 40/14* (2006.01)
*H03F 3/08* (2006.01)

(52) U.S. Cl. .................... 250/214 R; 250/214 A; 327/514

(58) Field of Classification Search .......... 250/214 AG
See application file for complete search history.

(56) References Cited

U.S. PATENT DOCUMENTS 4,673,807 A * 6/1987 Kobayashi et al. ... 250/214 AG

* cited by examiner

*Primary Examiner*—David Porta
*Assistant Examiner*—Suezu Ellis
(74) *Attorney, Agent, or Firm*—Sughrue Mion, PLLC (57) ABSTRACT

A photodetector continuously measure quantity of light ranging from high intensity to low intensity at high speed. The photodetector comprises an operational amplifier, a photodiode connected to an inverting terminal of the operational amplifier for outputting a signal corresponding to quantity of light to be detected, a plurality of feedback resistors differentiated in each resistance value, an analog switch for selectively connecting input terminals thereof to which one ends of the feedback resistors are connected to an output terminal of the operational amplifier except the feedback resistor having the maximum resistance value, or connecting the input terminal thereof which is rendered in a non-connection state to the output terminal of the operational amplifier instead of the feedback resistor having the maximum resistance value, wherein the feedback resistor having the maximum resistance value is connected to the output terminal of the operational amplifier at its one end and to the inverting input terminal of the operational amplifier at its other end, and wherein the other ends of the other feedback resistors are connected to the inverting input terminal of the operational amplifier.

7 Claims, 7 Drawing Sheets

- - - A; change of an output voltage on a time basis caused by a photoelectric current
- - - B; change of an output voltage on a time basis caused by a discharge current
— C; change of an output voltage on a time basis caused by a prior art

PHOTODETECTOR WITH PLURAL SWITCHED FEEDBACK RESISTORS

FIELD OF THE INVENTION

The invention relates to a photodetector for detecting intensity of light which is received by a photodiode.

BACKGROUND OF THE INVENTION

Figure 4:
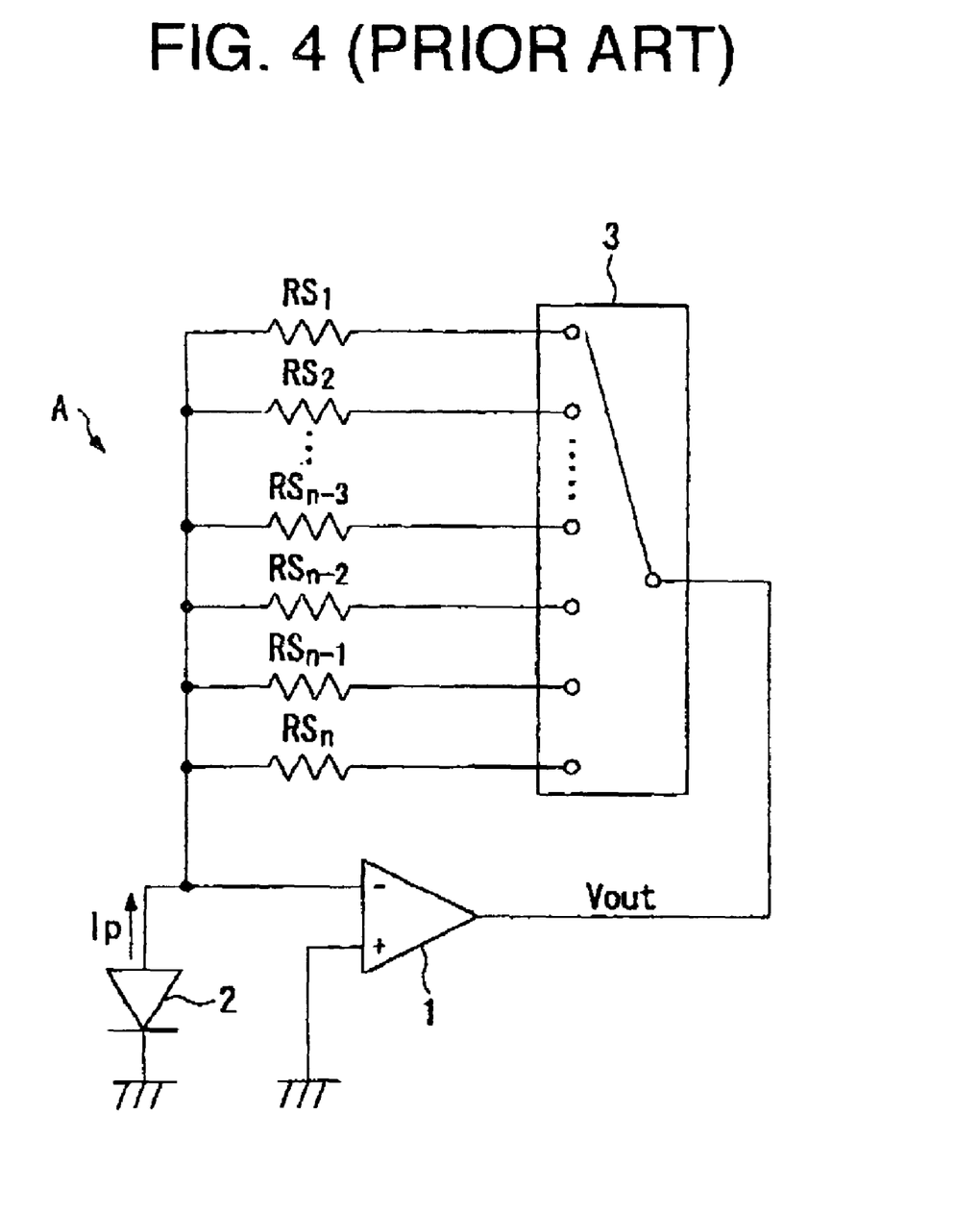
FIG. 4 is a circuit diagram of a photodetector A according to an example of a prior art.

A photodetector of this type amplifies an output of a photodiode by an operational amplifier, and FIG. 4 is a circuit diagram showing an example of a configuration of a conventional photodetector A. The photodetector A comprises an operational amplifier 1, a photodiode 2 connected to an inverting input terminal of the operational amplifier 1, a plurality of (n pieces of) feedback resistors RS1 to RSn which are connected to each input terminal of an analog switch 3 at each one end and commonly connected to the inverting input terminal of the operational amplifier 1 at each other end, and the analog switch 3 for selectively connecting one ends of the feedback resistors RS1 to RSn to an output terminal of the operational amplifier 1. Such a photodetector is a kind of a feedback amplifier for providing an output voltage Vout of the operational amplifier 1 by either of a resistance value Ri of the feedback resistors RS1 to RSn which are selected by a generation current Ip of the photodiode 2 and the analog switch 3.

The magnitude relation as shown in the following equation (1) is set between respective resistance values R1 to Rn of the feed back resistors RS1 to RSn.

$$Rn > Rn-1 > \ldots > Ri > Ri-1 > \ldots > R1 \tag{1}$$

The relation as shown in the following equation (2) is set so as to secure continuity of a measurement range between the respective resistance values R1 to Rn the feedback resistors RS1 to RSn. That is, the respective feedback resistors RS1 to RSn are set in the manner that the ratio between resistance values of resistors which are adjacent each other in magnitude relation between the resistance values R1 to Rn becomes ten times as large as therebetween.

$$Ri/Ri-1=1-10 \tag{2}$$

The n pieces of feedback resistors RS1 to RSn having the resistance values R1 to Rn and the analog switch 3 are provided to set a measurement range corresponding to intensity of light detected by the photodiode 2, wherein the feedback resistors RS1 to RSn are sequentially selected by the analog switch 3 to set the measurement range.

Further, the output voltage Vout of the operational amplifier 1 is given by the following equation (3) based on the generation current Ip, the resistance values R1 to Rn of the feedback resistors RS1 to RSn and an ON resistance Ron of the analog switch 3

$$Vout=-(Ri+Ron) \times Ip \tag{3}$$

The generation current Ip, i.e. intensity of light received by the photodiode 2 is obtained by measuring the output voltage Vout. The ON resistance Ron is in the order of several tens to several hundreds ohms which are smaller than the resistance values R1 to Rn of the feedback resistors RS1 to RSn but sharply varied depending on an ambient temperature, and hence it becomes the cause of an error when obtaining the generation current Ip based on the output voltage Vout.

Figure 5:
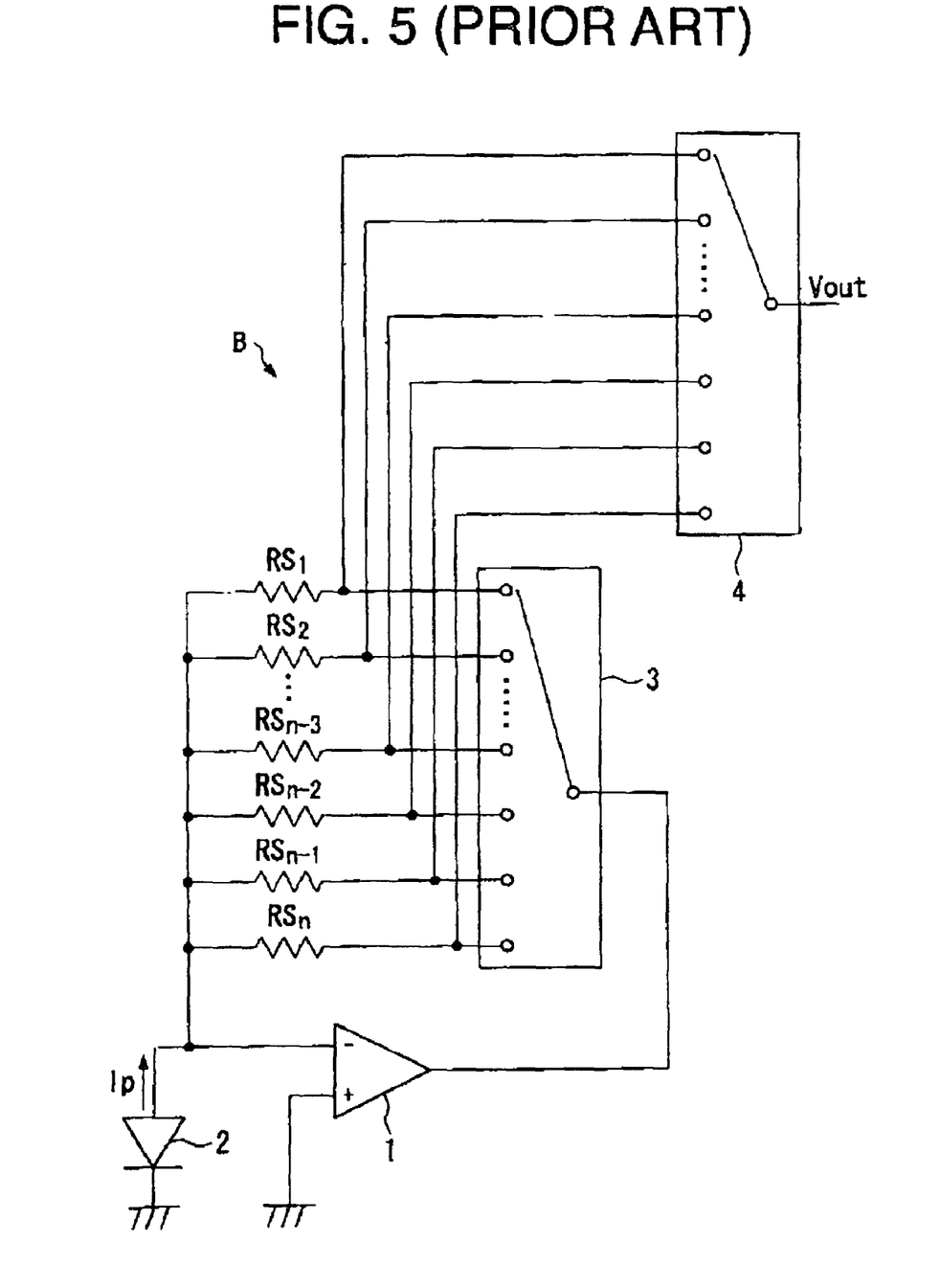
FIG. 5 is a circuit diagram of a photodetector B according to another example of a prior art.

A photodetector B shown in FIG. 5 eliminates effect by the ON resistance Ron, and has a second analog switch 4 for selecting the other ends of the feedback resistors RS1 to RSn to externally output as the output voltage Vout. Since the output voltage Vout is taken out between the feedback resistors RS1 to RSn and the analog switch 3 according to such a photodetector B, it is provided irrespective of the ON resistance Ron of the analog switch 3. Accordingly, the error caused by the ON resistance Ron is solved by such a photodetector B.

Meanwhile, although a time interval when obtaining a measurement value is designated as a sampling interval, as the sampling interval is shorter, the measurement value can be obtained in a short period of time. The sampling interval of the conventional photodetectors is determined by time needed for switching the feedback resistors RS1 to RSn by the analog switch 3. Accordingly, a type which can switch over the feedback resistors RS1 to RSn at high speed is selected as the analog switch 3, but there occurs a problem that the sampling interval cannot be shortened more because it takes time for charging and discharging electric charge caused by capacitance at an input terminal or output terminal of the analog switch 3.

Figure 6:
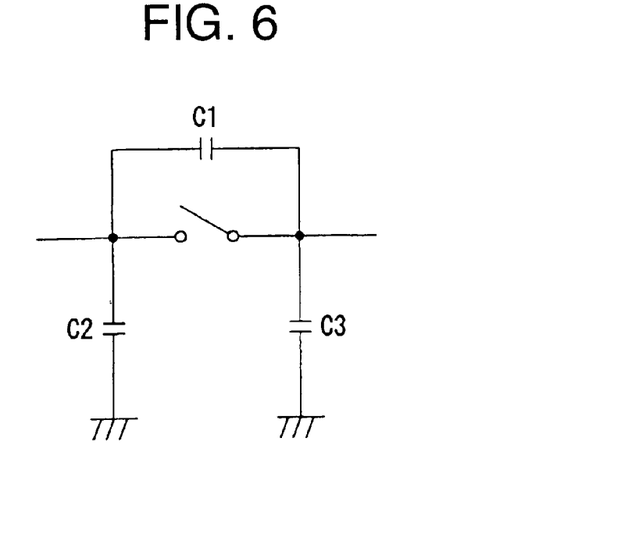
FIG. 6 is an equivalent circuit of an analog switch.

FIG. 6 shows an equivalent circuit of the analog switch 3. Depicted by C1 is a capacitance between an input terminal and an output terminal of the analog switch 3, C2 is a capacitance at the input terminal thereof, and C3 is a capacitance at the output terminal thereof. The capacitances C2 and C3 are about several tens pF, and the capacitance C1 is about 0. several to several pF.

Figure 7:
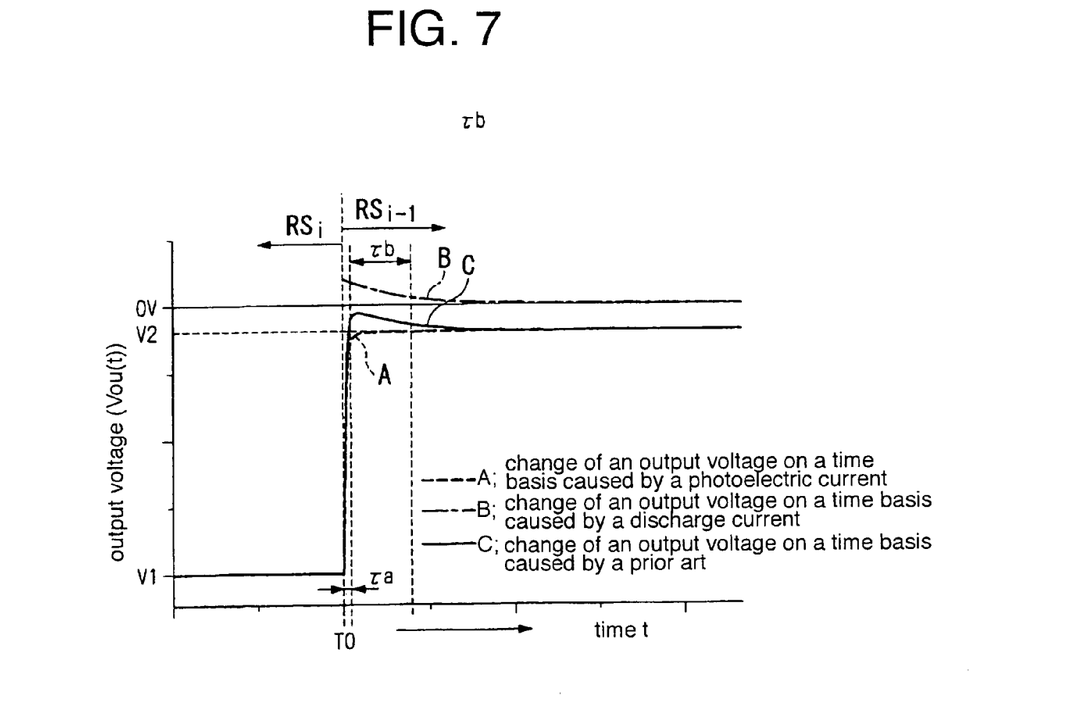
FIG. 7 is a view for explaining change of an output voltage Vout.

FIG. 7 shows the change of the output voltage Vout on a time basis when the feedback resistor RSi is switched to the feedback resistor Rsi-1 at a switching time T0.

Supposing that the output voltage Vout is V1 and the generation current Ip is constant when the feedback resistor Rsi is selected, the output voltage Vout on and after the switch time T0 is given by the following equation (4).

$$Vout=Ri-1/Ri \times V1=V2 \tag{4}$$

Supposing that the output voltage Vout given by the equation (4) is a voltage V2, the voltage V2 is expressed by the following equation (5) based on the equation (2).

$$V2=1/10 \times V1 \tag{5}$$

Meanwhile, the analog switch 3 has the capacitance C1 between the input and output terminals thereof as set forth above. According to the photodetector A shown in FIG. 4, since then pieces of input terminals of the analog switch 3 are connected respectively to the inverting input terminal of the operational amplifier 1 through the feedback resistors RS1 to RSn, the feedback resistor RSi is considered to be in a state where the capacitance Cf (equivalent capacitance) each having several pF are equivalently connected in parallel with each other by the capacitance C1. Accordingly, the change of the output voltage Vout on a time basis when the feedback resistor RSi is switched to the feedback resistor RSi-1 has relaxation characteristics as shown by the line A in FIG. 7.

A time constant τa of the relaxation characteristics is given by the following equation (6).

$$\tau a = Ri-1 \times Cf \tag{6}$$

Further, at this time, although the voltage V1 is applied to the capacitance C2 at the input terminal of the analog switch 3 connected to the feedback resistor RSi before the switching time T0, the electric charge charged in the capacitance C2 is discharged after the analog switch 3 selected the feedback resistor RSi-1 at the switching time T0. The discharge current Id is given by the following equation (7).

$$Id = V1/Ri \times exp(-t/\tau b) \quad (7)$$

The time constant $\tau b$ in this equation (7) is given by the following equation (8).

$$\tau b = Ri \times C2 \quad (8)$$

The discharge current Id flows to the feedback resistor RSi-1 after the switching time T0, and appears as a voltage Vd at the time of change of the output voltage Vout. The voltage Vd is expressed by the following equation (9).

$$Vd = Ri-1/Ri \times V1 \times exp(-t/\tau b) \quad (9)$$

The voltage Vd based on the discharge current Id is to be changed as shown in dotted line B in FIG. 7.

That is, the output voltage Vout has variation characteristics as shown by a line C in FIG. 7 as a characteristic combined by the line A and the dotted line B in FIG. 7.

Figure 8:
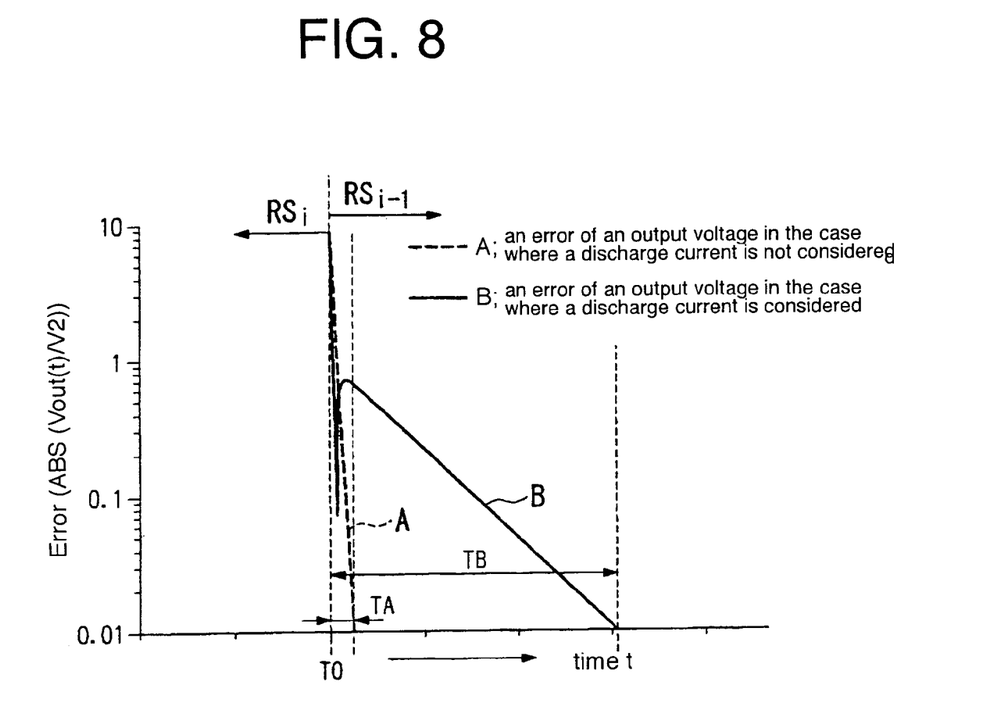
FIG. 8 is a view for explaining an error of the output voltage Vout.

FIG. 8 is a view showing change of an error on a time basis after the switching time T0. An error is an absolute value obtained by dividing the output voltage Vout by the voltage V2. In the case of the output voltage Vout not considering the discharge current Id shown in the line A, it becomes the change of the error on a time bases shown in the line A in FIG. 8, and time (convergent time) required for the error to reach 0.01 is TA. Whereupon, in the case of the output voltage Vout considering the discharge current Id shown in the line C in FIG. 7, it becomes the change of the error on a time basis shown in the line B in FIG. 8, and convergent time needing to become an error equivalent to the dotted line A becomes Tb which is more longer than the convergent time Ta.

For example, supposing that Ri=10 MΩ, Ri-1=1 MΩ, Cf=2 pF, C2=10 pF, the equations $\tau a$=2 µsec, TA=10µsec, $\tau b$=100 µsec, TB=450 µsec are established. Even in the case where the feedback resistor RSi-2 is switched to the feedback resistor RSi-1, the discharge current passing through the feedback resistor RSi-2 flows but the resistance value Ri-2 of the feedback resistor RSi-2 becomes 100K Ω based on the equation of (2), and hence the time constant $\tau b$ at this time becomes 1 µsec (=100KΩ×10 pF) using the above mentioned constant, which is shorter than the time constant $\tau a$, and it does not cause any problem.

In the case where the feedback resistors RS1 to RSn are switched from high resistance value to low resistance value, the discharge current passes through a high resistor, and hence a relaxation time becomes very long. Accordingly, the sampling interval cannot be shortened, and hence it is difficult to continuously measure the intensity of light ranging from high intensity to low intensity at high speed.

SUMMARY OF THE INVENTION

The invention has been developed in view of the following problems, and it is an object of the invention to continuously measure quantity of light ranging from high intensity to low intensity at high speed.

To achieve the above object, a photodetector of the invention employs a configuration as first means comprising an operational amplifier, a photodiode connected to an inverting terminal of the operational amplifier for outputting a signal corresponding to quantity of light to be detected, a plurality of feedback resistors differentiated in each resistance value, an analog switch for selectively connecting input terminals thereof to which one ends of the feedback resistors are connected to an output terminal of the operational amplifier except the feedback resistor having the maximum resistance value, or connecting the input terminal thereof which is rendered in a non-connection state to the output terminal of the operational amplifier instead of the feedback resistor having the maximum resistance value, wherein the feedback resistor having the maximum resistance value is connected to the output terminal of the operational amplifier at its one end and to the inverting input terminal of the operational amplifier at its other end, and wherein the other ends of the other feedback resistors are connected to the inverting input terminal of the operational amplifier.

The photodetector employs a configuration as second means structured such that in the first means, the other end of the feedback resistor having high resistance value of the other feedback resistors is serially connected to the feedback resistor having a small resistance value.

The photodetector employs a configuration as third means structured such that in the first or second means, the photodetector further comprises a second analog switch for selecting the output terminal of the operational amplifier to externally output as an output voltage in the case where the analog switch selects the input terminal thereof which is rendered in a non-connection state instead of one end of the feedback resistor having the maximum resistance value, or the input terminals thereof to which one ends of the serially connected feedback resistors are connected, thereby connecting the selected input terminals to the output terminal of the operational amplifier, and for selecting one ends of the feedback resistors to externally output as the output voltage in the same manner as the analog switch selects in the case where the analog switch selects the input terminal which is rendered in a non-connection state, or the input terminals thereof to which one ends of the feedback resistor are connected except the input terminals thereof to which one ends of the serially connected feedback resistors are connected.

The photodetector employs a configuration as fourth means structured such that in the third means, the photodetector further comprises an additional feedback resistor connected to the output terminal of the operational amplifier at its one end and to the inverting input terminal of the operational amplifier at its other end and having a resistance value which is higher than the feedback resistor having the maximum resistance value, and a mechanical relay for connecting/disconnecting the other ends of the feedback resistors other than the additional feedback resistor to and from the inverting input terminal of the operational amplifier.

The photodetector employs a configuration as fifth means structured such that in the fourth means, the photodetector further comprises a second mechanical relay for grounding the other ends of the feedback resistors other than the additional feedback resistor in the case where the other ends of the feedback resistors other than the additional feedback resistor is disconnected from the inverting input terminal of the operational amplifier.

According to the invention, the feedback resistors each having high resistance value which impedes a high speed is arranged such that the feedback resistor having the maximum resistance value is interposed between an inverting input terminal and an output terminal of the operational amplifier without through an analog switch so as to reduce the effect of the capacitance at terminal of the analog switch. Although the other feedback resistors are interposed between the inverting input terminal and the output terminal of the operational amplifier through the analog switch except the feedback resistor having the maximum resistance value, the effect of the capacitance at the terminal is reduced by connecting the other end of the feedback resistor having high resistance value to one end of the feedback resistor having low resistance value without deteriorating the continuity of measurement range by the change of selection of the feedback resistors.

PREFERRED EMBODIMENT OF THE INVENTION

Preferred embodiments of photodetectors according to the invention are now described with reference to the attached drawings. Constituents which are the same as those of the photodetectors shown in FIG. 4 or FIG. 5 and already explained are depicted by the same numeral references.

Figure 1:
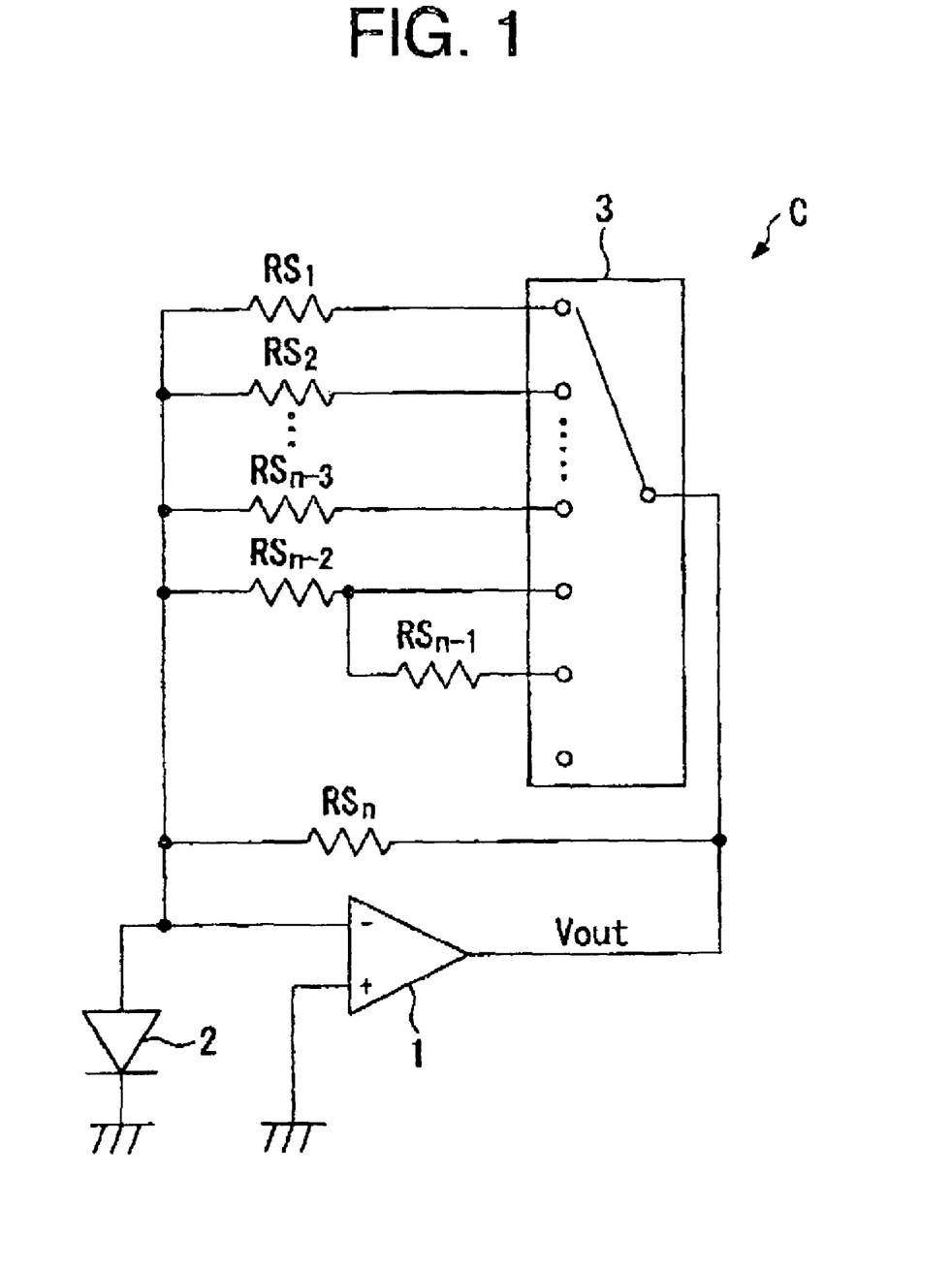
FIG. 1 is a circuit diagram of a photodetector C according to a first embodiment of the invention.

First Embodiment:

FIG. 1 is a circuit diagram of a photodetector C according to a first embodiment of the invention. Although the photodetector C is structured by the constituents which are the same as those of the conventional photodetector A shown in FIG. 4, the connection relation between feedback resistor RSn-1 and the feedback resistor RSn of the former is different from that of the latter. That is, according to the photodetector C, the feedback resistor RSn having the maximum resistance value is connected to an output terminal of an operational amplifier 1 at its one end and to an inverting input terminal of the operational amplifier 1 at its other end.

That is, according to the conventional photodetector A, one end of the feedback resistor RSn having the maximum resistance value is connected to the input terminal of the analog switch 3, whereupon according to the photodetector C of the invention, one end of the feedback resistor RSn having the maximum value is directly connected to the output terminal of the operational amplifier 1. Encountering the change of connection of one end of the feedback resistor RSn having such a large resistance value, the input terminal of the analog switch 3 to which one end of the feedback resistor RSn having such a large resistance value is connected in the conventional photodetector A is rendered in a non-connection state.

The feedback resistor RSn-1 having the resistance value which is next largest to the maximum resistance value of the feedback resistor RSn of the feedback resistors RS1 to RSn-1 except the feedback resistor RSn having the maximum resistance value is connected to one end of the feedback resistor RSn-2 at its other end so as to be serially connected to the feedback resistor RSn-2 having the resistance value next largest to the resistance value of the feedback resistor RSn-1.

The photodetector C having such an arrangement is switched in measurement range by switching the selection of the feedback resistors RS1 to RSn by the analog switch 3. When the measurement range is switched in such a manner, the output voltage Vout corresponding to intensity of light ranging from high intensity to lower intensity is outputted.

Since the feedback resistor RSn having the maximum resistance value is directly connected between the output terminal and the inverting input terminal of the operational amplifier 1 without through the analog switch 3, the output voltage Vout converges on a constant value at high speed without being affected by capacitance of the analog switch 3 in the case where the measurement range is switched while selecting the feedback resistor RSn-1 having the resistance value next largest to the maximum resistance value of the feedback resistor RSn from the state where the measurement range is set using the feedback resistor RSn having the maximum resistance value.

Although all generation current Ip of the photodiode 2 flows to the feedback resistor RSn having the maximum resistance value to set the output voltage Vout in a state where the measurement range is set using the feedback resistor RSn having the maximum resistance value, the generation current Ip of the photodiode 2 is divided into the feed back resistor RSn having the maximum resistance value, a serial resistor comprised of the feedback resistor RSn-1 having the maximum resistance value next largest to the resistance value of the feedback resistor RSn and the feedback resistor RSn-2 having resistance value next largest to the resistance value of the feedback resistor RSn-1 in the case where the analog switch 3 switches the measurement range while selecting the feedback resistor RSn-1 having the resistance value next largest to the maximum resistance value of the feedback resistor RSn.

The output voltage Vout in this case is expressed by the following equation (10) supposing that the combined resistance value of the three feedback resistors RSn-2 to RSn is Rs.

$$Vout = -Rs \times Ip \qquad (10)$$

Further, the combined resistance value Rs is given by the following equation (11).

$$Rs = \{(Rn-2+Rn-1)//Rn\} \qquad (11)$$

Still further, since the relation between the resistance values Rn-2 to Rn of the feedback resistors RSn-2 to RSn, is established as expressed in the foregoing equations (1) and (2), the relation between the resistance values Rn-2 to Rn is expressed by the following equation (12).

$$Rn-1 = 10Rn-2, \ Rn = 100Rn-2 \qquad (12)$$

That is, since the combined resistance value Rs is expressed in the following equation (13), it is substantially equal to a value of the resistance value Rn-1 of the feedback resistor RSn-1, which substantially satisfies the condition of the foregoing equation (2). Accordingly, the continuity of the measurement range is secured.

$$Rs = 9.91Rn-2 \qquad (13)$$

Further, in the case where the analog switch 3 switches the measurement range while selecting the feedback resistor RSn-2 from the above state, the electric charge charged in the capacitance C2 at the input terminal connected to one end of the feedback resistor RSn-1 is discharged through the feedback resistor RSn−1. However, since the other end of the feedback resistor RSn−1 is connected to the output terminal of the operational amplifier 1 having small internal resistance together with one end of the feedback resistor RSn−2 through the analog switch 3, the electric charge accumulated in the capacitance C2 is discharged toward the output of the operational amplifier 1 through the feedback resistor RSn−1 and the analog switch 3.

According to the conventional photodetector A, since the other end of the feedback resistor RSn−1 is connected to the inverting input terminal of the operational amplifier 1 having a high internal resistance, the electric charge of the capacitance C2 is discharged toward the output of the operational amplifier 1 through the feedback resistors RSn−1, RSn−2. The discharged current flowing in the feedback resistor RSn−2 appears as the output voltage as an error. According to the photodetector C of the invention, since the electric charge is discharged through the feedback resistor RSn−1 and the analog switch 3, this effect scarcely appears on the output voltage. Accordingly, according to the photodetector C of the invention, the sampling interval can be shortened while securing the continuity of the measurement range.

Figure 2:
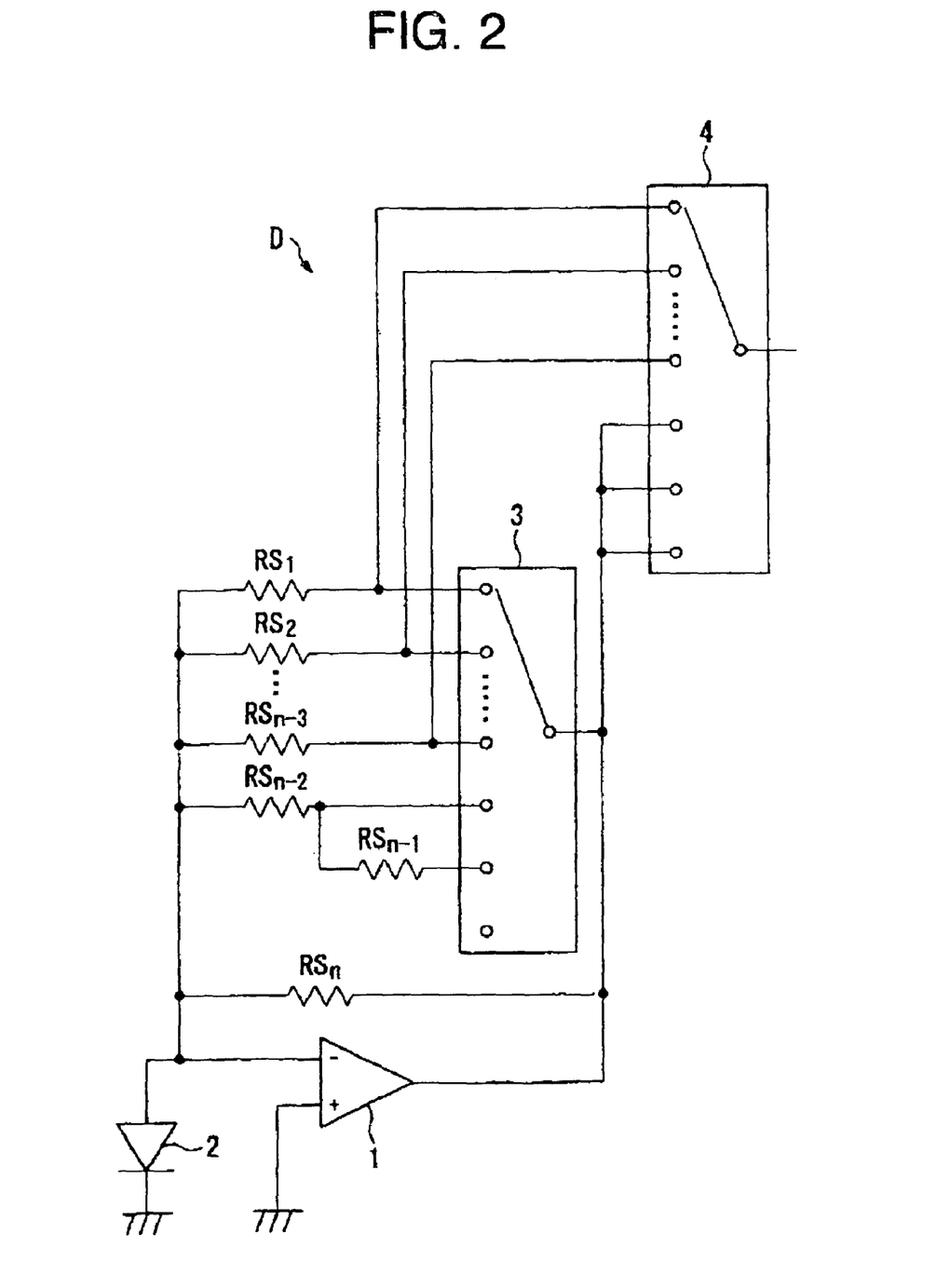
FIG. 2 is a circuit diagram of a photodetector D according to a second embodiment of the invention.

Second Embodiment:

FIG. 2 is a circuit diagram of a photodetector D according to a second embodiment of the invention. The photodetector D adds a second analog switch 4 to the photodetector C of the first embodiment.

The second analog switch 4 selects the output terminal of the operational amplifier 1 to externally output as an output voltage Vout in the case where the analog switch 3 selects the input terminal thereof which is rendered in a non-connection state, or the input terminals thereof to which one ends of the serially connected feedback resistors RSn−1, RSn−2 are connected, thereby connecting the selected input terminals to the output terminal of the operational amplifier 1, and selects one ends of the feedback resistors RS1 to RSn−3 to externally output as the output voltage Vout in the same manner as the analog switch 3 selects in the case where the analog switch 3 selects the input terminal which is rendered in a non-connection state, or the input terminals thereof to which one ends of the feedback resistor RS1 to RSn−3 are connected except the input terminals thereof to which one ends of the serially connected feedback resistors RSn−1, RSn−2 are connected.

That is, since the photodetector D takes out the output voltage Vout from the input terminal of the analog switch 3 in the case where the analog switch 3 selects the feedback resistors RS1 to RSn−3 so as to set measurement range, the output voltage Vout having high accuracy can be obtained without being affected by an ON resistance Ron of the analog switch 3.

On the other hand, in the case where the analog switch 3 selects the input terminal which is in a non-connection state, namely, in the case where the feedback resistor RSn having the maximum resistance value is used to set the measurement range, and in the case where the analog switch 3 selects the input terminal thereof to which the respective one ends of the serially connected feedback resistors RSn−1, RSn−2 are connected so as to set the measurement range, the output voltage Vout is directly taken out from the output terminal of the operational amplifier 1. That is, in the case where the feedback resistor RSn having the maximum resistance value is used for setting the measurement range in this case, the feedback resistor RSn is directly interposed between the output terminal and the inverting input terminal of the operational amplifier 1 so that the output voltage Vout having high accuracy can be obtained without being affected by the ON resistance Ron of the analog switch 3.

Whereupon, in the case where the analog switch 3 selects the input terminal thereof to which respective one ends of the feedback resistors RSn−1, RSn−2 are connected so as to set the measurement range, the feedback resistor RSn−1 and the feedback resistor RSn−2 are directly interposed between the output terminal and the inverting input terminal of the operational amplifier 1 through the analog switch 3, or the feedback resistor RSn−2 is to be directly interposed between the output terminal and the inverting input terminal of the operational amplifier 1 through the analog switch 3, so that the output voltage Vout is affected by the ON resistance Ron of the analog switch 3. However, since the ON resistance Ron is normally not more than 100 Ω and the resistance values Rn−1 and Rn−2 of the feedback resistors RSn−1, RSn−2 have high resistance value of the order of several MΩ, the effect by the ON resistance Ron is very small and negligible.

Figure 3:
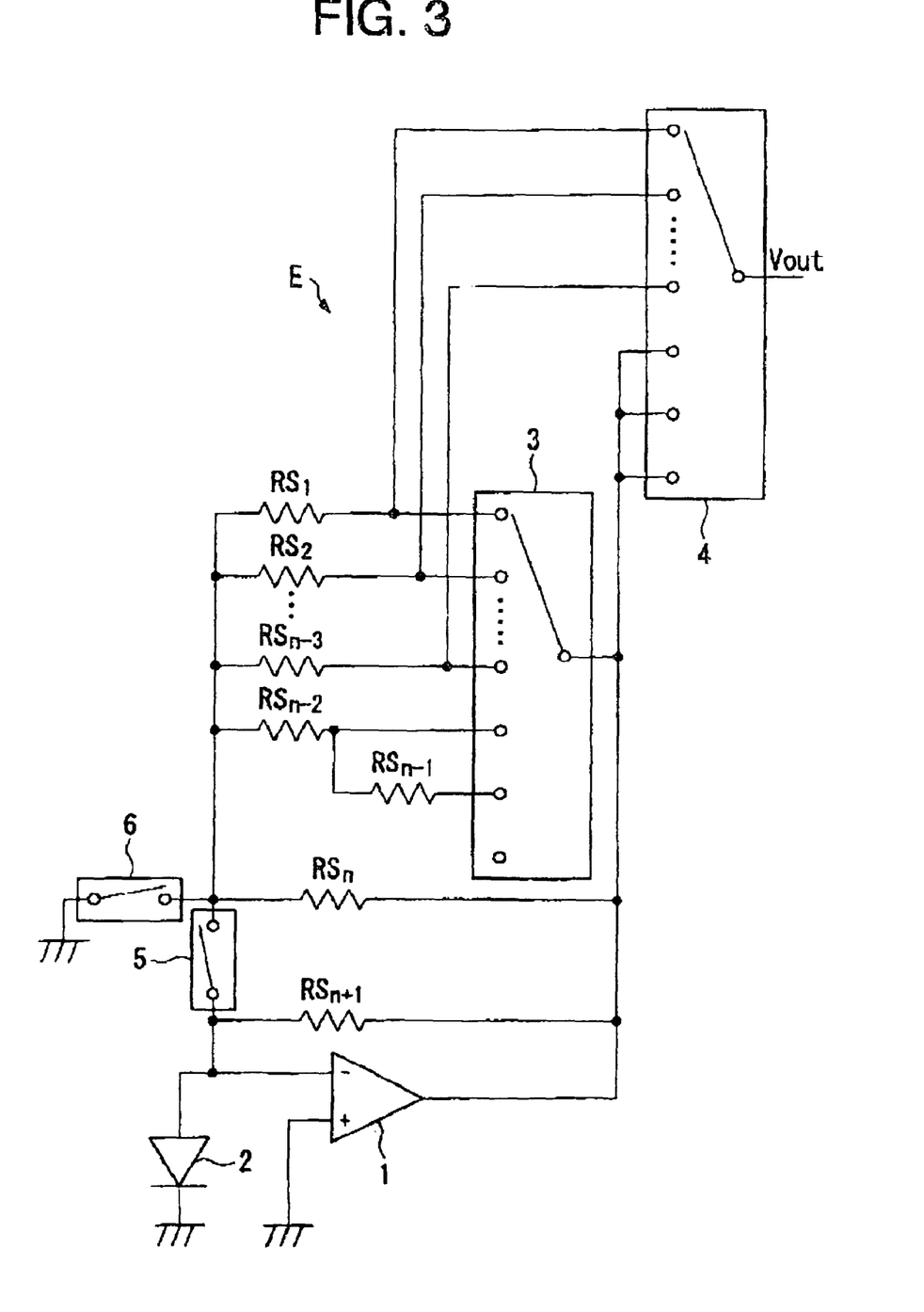
FIG. 3 is a circuit diagram of a photodetector E according to a third embodiment of the invention.

Third Embodiment:

FIG. 3 is a circuit diagram of a photodetector E according to a third embodiment of the invention. The photodetector E adds the following constituents to the photodetector D of the second embodiment. That is, an additional feedback resistor RSn+1 connected to an output terminal of an operational amplifier 1 at one end and to an inverting input terminal of the operational amplifier 1 at the other end and having resistance value higher than that of a feedback resistor RSn having the maximum resistance value, a mechanical relay 5 for effecting connection/disconnection of the other ends of the feedback resistors RS1 to RSn other than the additional feedback resistor RSn+1 to and from an inverting input terminal of the operational amplifier 1, and a mechanical relay 6 for grounding/releasing the other ends of the feedback resistors RS1 to RSn other than the additional feedback resistor RSn+1. The resistance value Rn+1 of the additional feedback resistor RSn+1 naturally satisfies the condition of the equation (2), namely, it is ten times as large as the resistance value Rn of the feedback resistor RSn.

According to the photodetector D of the second embodiment, since the (n−1) pieces of input terminals of the analog switch 3 are in a state where they are connected to the inverting input terminal of the operational amplifier 1 through the feedback resistors RS1 to RSn, when the feedback resistor RSn having high resistance value is used so as to set the measurement range, there arises a problem that a gain of the operational amplifier 1 is equivalently large owing to a pattern or leakage from an analog switch to increase noise. Further, since the analog switch 3 has the capacitance C1 between input and output terminals, and the feedback resistor RSn having a high resistance value is used to set the measurement range, a response to the change of quantity of light is delayed so that high speed measurement cannot be effected.

However, according to the photodetector E of the third embodiment of the invention, when the additional feedback resistor RSn+1 is used to set the measurement range, the mechanical relay 5 is set at an open state to disconnect the respective other ends of all the feedback resistors RS1 to RSn except the additional feedback resistor RSn+1 from the inverting input terminal of the operational amplifier 1. The measurement range in this state is used for detecting light having intensity smaller than that in the case of the measurement range using the feedback resistor RSn having the maximum resistance value, the mechanical relay 5 which takes time in switching longer than the analog switch 3 and the second analog switch 4, and hence it takes time for switching from the other measurement range.

On the contrary, when the measurement range is set using the feedback resistors RS1 to RSn other than the additional feedback resistor RSn+1, the mechanical relay 5 is rendered in a close state. In this case, since the ON resistance of the mechanical relay 5 is smaller than that of the analog switch 3, it hardly affects the accuracy of the output voltage Vout. When the measurement range is switched using the feedback resistors RS1 to RSn, it is not necessary to switch the state of the mechanical relay 5, and hence the smooth switching of the measurement range is secured.

In a state of the measurement range using the additional feedback resistor RSn+1, since one ends of the feedback resistors RS1 to RSn are connected to the output terminal of the operational amplifier 1 through the analog switch 3, the potentials at the other ends of the feedback resistors RS1 to RSn are different from the potential at the inverting input terminal of the operational amplifier 1. Accordingly, when the other ends of the feedback resistors RS1 to RSn are connected to the inverting input terminal of the operational amplifier 1 by switching the mechanical relay 5 to a close state, namely, when the measurement range is switched, the operational amplifier 1 is temporarily saturated, so that it takes time for the output voltage Vout to converge on a steady-state voltage. In view of such a circumstance, in the case where the second mechanical relay is provided on the other ends of the feedback resistors RS1 to RSn while the measurement range is set using the additional feedback resistor RSn+1, it is considered that the other ends of the feedback resistors RS1 to RSn are grounded.

Although two feedback resistors RSn−1, RSn−2 each having a resistance value next largest to the maximum resistance value of the feedback resistor RSn are seriously connected to each other, in the case where the relaxation time of the discharge current Id causes a problem when the feedback resistor RSn−2 having smaller resistance value of the feedback resistors RSn−1, RSn−2 is used to set the measurement range, a feedback resistor RSn−3 having a resistance value next largest to feedback resistor RSn−1 is also serially connected to the feedback resistors RSn−1, RSn−2. That is, according to the photodetectors C to E of the invention, the other end of the feedback resistor RSn−2 is connected to one end of the feedback resistor RSn−3 having a resistance value next largest to the resistance value of the feedback resistor RSn−2.

As mentioned in detail above, since the photodetector of the invention comprises the operational amplifier, the photodiode connected to the inverting terminal of the operational amplifier for outputting the signal corresponding to quantity of light to be detected, the plurality of feedback resistors differentiated in each resistance value, the analog switch for selectively connecting input terminals thereof to which one ends of the feedback resistors are connected to the output terminal of the operational amplifier except the feedback resistor having the maximum resistance value, or connecting the input terminal thereof which is rendered in a non-connection state to the output terminal of the operational amplifier instead of the feedback resistor having the maximum resistance value, wherein the feedback resistor having the maximum resistance value is connected to the output terminal of the operational amplifier at its one end and to the inverting input terminal of the operational amplifier at its other end, and wherein the other ends of the feedback resistors are connected to the inverting input terminal of the operational amplifier, that is, since the feedback resistor having the maximum resistance value is interposed between the inverting input terminal and the output terminal of the operational amplifier without through the analog switch, it is possible to reduce the effect by the capacitance at terminal of the analog switch, thereby shortening the sampling interval when continuously measuring quantity of light ranging from high intensity to low intensity.

What is claimed is:

1. A photodetector comprising:
an operational amplifier having an inverting terminal and an output terminal;
a photodiode connected to the inverting terminal of the operational amplifier for outputting a signal corresponding to a quantity of light to be detected;
a plurality of feedback resistors, each being differentiated in resistance value, one of said feedback resistors having a maximum resistance value and being coupled between the inverting terminal and the output terminal of the operational amplifier;
a first analog switch for selectively connecting one end of each feedback resistor, other than the resistor having a maximum resistance value, to an input terminal and connecting the other end to the output terminal of the operational amplifier; and
a second analog switch that is used for selecting at least among (1) the output terminal of the operational amplifier, and (2) an end of one of the plurality of feedback resistors to externally output an output voltage,
wherein the other ends of the other feedback resistors are connected to the inverting input terminal of the operational amplifier.

2. A photodetector according to claim 1 further comprising:
an additional feedback resistor connected to the output terminal of the operational amplifier at its one end and to the inverting input terminal of the operational amplifier at its other end and having a resistance value which is higher than the feedback resistor having the maximum resistance value; and
a mechanical relay for connecting/disconnecting the other ends of the feedback resistors other than the additional feedback resistor to and from the inverting input terminal of the operational amplifier.

3. The photodetector according to claim 2, further comprising a second mechanical relay for grounding the other ends of the feedback resistors other than the additional feedback resistor in the case where the other ends of the feedback resistors other than the additional feedback resistor is disconnected from the inverting input terminal of the operational amplifier.

4. A photodetector comprising:
an operational amplifier having an inverting terminal and an output terminal;
a photodiode connected to the inverting terminal of the operational amplifier for outputting a signal corresponding to a quantity of light to be detected;
a plurality of feedback resistors, each being differentiated in resistance value, one of said feedback resistors having a maximum resistance value and being coupled between the inverting terminal and the output terminal of the operational amplifier; and
a first analog switch for selectively connecting one end of each feedback resistor, other than the resistor having a maximum resistance value, to an input terminal and connecting the other end to the output terminal of the operational amplifier;

wherein the other ends of the other feedback resistors are connected to the inverting input terminal of the operational amplifier, and wherein at least one of said feedback resistors comprises a first resistor portion comprising one of said feedback resistors and a second resistor portion connected in series with said first resistor portion, said second resistor portion having a higher resistance value than said first portion but less than the resistance of said maximum feedback resistor.

5. The photodetector according to claim 2, further comprising a second analog switch that is used for selecting among (1) the output terminal of the operational amplifier, (2) an end of one of the plurality of feedback resistors, other than the first resistor portion, and (3) an end of each of said first resistor portion and said second resistor portion to externally output an output voltage.

6. The photodetector according to claim 5 further comprising an additional feedback resistor connected to the output terminal of the operational amplifier at its one end and to the inverting input terminal of the operational amplifier at its other end and having a resistance value which is higher than the feedback resistor having the maximum resistance value; and a mechanical relay for connecting/disconnecting the other ends of the feedback resistors other than the additional feedback resistor to and from the inverting input terminal of the operational amplifier.

7. The photodetector according to claim 6, further comprising a second mechanical relay for grounding the other ends of the feedback resistors other than the additional feedback resistor in the ease where the other ends of the feedback resistors other than the additional feedback resistor is disconnected from the inverting input terminal of the operational amplifier.

* * * * *